(12) United States Patent
Singh

(10) Patent No.: US 10,728,167 B2
(45) Date of Patent: Jul. 28, 2020

(54) INTERRUPT DISTRIBUTION OF A SINGLE FLOW ACROSS MULTIPLE PROCESSORS

(71) Applicant: ORACLE INTERNATIONAL CORPORATION, Redwood Shores, CA (US)

(72) Inventor: Brijesh Singh, Mercer Island, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 14 days.

(21) Appl. No.: 16/100,309

(22) Filed: Aug. 10, 2018

(65) Prior Publication Data

US 2020/0053019 A1 Feb. 13, 2020

(51) Int. Cl.
*H04L 12/863* (2013.01)
*H04L 29/06* (2006.01)
*G06F 13/24* (2006.01)
*H04L 12/46* (2006.01)
*H04L 12/861* (2013.01)

(52) U.S. Cl.
CPC .......... *H04L 47/6295* (2013.01); *G06F 13/24* (2013.01); *H04L 12/4633* (2013.01); *H04L 49/9068* (2013.01); *H04L 69/16* (2013.01)

(58) Field of Classification Search
CPC . H04L 47/6295; H04L 69/16; H04L 12/4633; H04L 49/9068; G06F 13/24
See application file for complete search history.

(56) References Cited

U.S. PATENT DOCUMENTS

| 7,581,052 B1 | 8/2009 | Solomita |
| 7,707,344 B2 | 4/2010 | Chang et al. |
| 7,962,679 B2 | 6/2011 | van de Ven |
| 9,304,825 B2 | 4/2016 | Pope |
| 2006/0112208 A1 | 5/2006 | Accapadi et al. |

(Continued)

FOREIGN PATENT DOCUMENTS

CN 106101019 A 11/2016

OTHER PUBLICATIONS

Broadcom 5708C PB08R, 1 pg, downloaded on Aug. 9, 2018 from: https://www.scribd.com/document/54697890/Broadcom-5708C-PB08-R.

(Continued)

*Primary Examiner* — Walter J Divito
(74) *Attorney, Agent, or Firm* — Kraguljac Law Group, LLC

(57) ABSTRACT

Systems, methods, and other embodiments that interrupt multiple processors to process packets of a single flow are described. In one embodiment, a method includes maintaining a plurality of queues to hold interrupt requests created for packets received by a network device. Each queue is associated with a processor that will be interrupted by interrupt requests to process packets. The network device is configured to control how to queue interrupt requests created for a flow of packets. The network device is configured such that when a threshold number of interrupt requests created for the flow of packets have been inserted within a queue, subsequent interrupt requests created for subsequently received packets of the flow are inserted in a different queue. In this way, the network device is controlled to interrupt multiple processors for the flow of packets by queuing interrupt requests for the flow into different queues.

16 Claims, 10 Drawing Sheets

(56) References Cited

U.S. PATENT DOCUMENTS

| | | | |
|---|---|---|---|
| 2006/0136642 A1 | 6/2006 | Ooi | |
| 2007/0255802 A1* | 11/2007 | Aloni | H04L 69/16 |
| | | | 709/217 |
| 2008/0225705 A1* | 9/2008 | Janarthanan | H04L 43/065 |
| | | | 370/230 |
| 2009/0006521 A1 | 1/2009 | Veal et al. | |
| 2012/0250682 A1* | 10/2012 | Vincent | H04L 12/4633 |
| | | | 370/390 |
| 2015/0067191 A1* | 3/2015 | Makhervaks | H03M 13/09 |
| | | | 709/244 |
| 2016/0112313 A1* | 4/2016 | Niu | H04L 45/00 |
| | | | 370/392 |

OTHER PUBLICATIONS

Solarflare Flareon SFN7002F—network adapter, pp. 1-2; downloaded on Aug. 9, 2018 from: https://www.solarflare.com/Media/Default/PDFs/SF-111771-CD-LATEST_Solarflare_SFN7002F_Product_Brief.pdf.

* cited by examiner

INTERRUPT DISTRIBUTION OF A SINGLE FLOW ACROSS MULTIPLE PROCESSORS

BACKGROUND

Many computers have multiple processors that can process information, such as packets of data received over a network. In order to leverage processing power of more than a single processor of a computer, a network device such as a network interface card can support receive-side scaling (RSS) and/or receive flow steering (RFS) technologies. The network device can leverage these technologies to distribute data packets received over the network to different processors for processing. However, these technologies will distribute all data packets of a single flow of data between a source and a destination to the same processor of the destination.

In one example, a single flow of data corresponds to packets communicated between a remote computer as a source and a service hosted by the computer as the destination. The network device receives packets from the remote computer as the single flow of packets destined for the service. Different flows of packets can be distinguished between each other based upon source and destination information, such as source IP and port and destination IP and port. However, existing packet distribution techniques are unable to distribute packets of a single flow to multiple processors. Thus, the same processor will always process packets of the same single flow.

In particular, all data packets of that single flow of data will trigger the network device to interrupt the same processor for processing those data packets. Thus, these technologies are limited to merely interrupting the same processor for processing packets of the same single flow. For example, RSS will hash data packets based upon a source IP and port so that data packets from different source IPs and ports will be processed by different processors. However, a single flow of data from the same source IP and port will cause the same processor to be interrupted for processing all packets of that single flow. This significantly limits the ability to leverage processor parallelism, and causes bottlenecks where the same processor is overburdened with processing packets of the same flow. Further, the delay in processing the packets will increase latency for the remote client computer in accessing the service.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
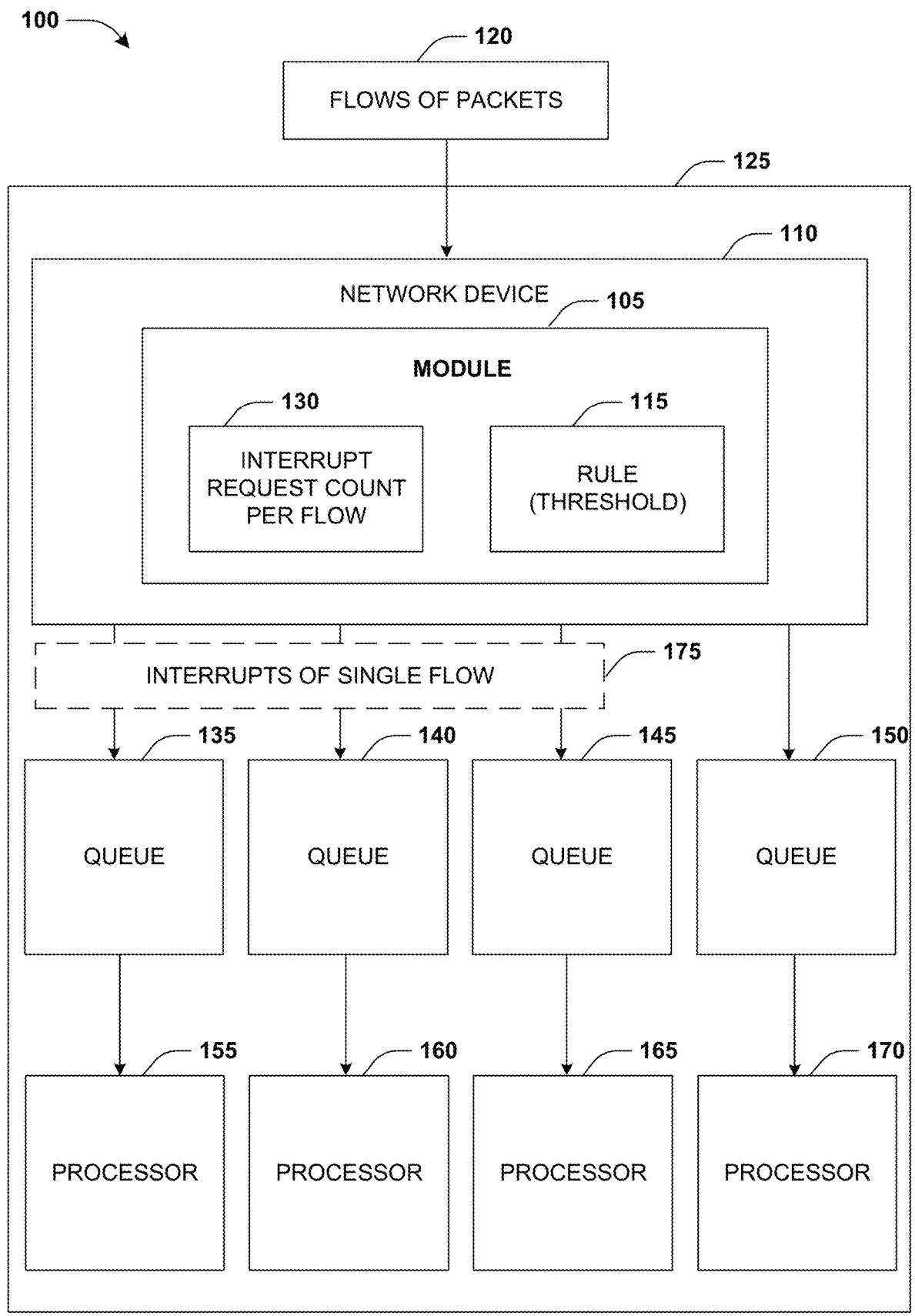
FIG. 1 illustrates an embodiment of a system associated with interrupting multiple processors for processing packets of a single flow.

Computerized systems and methods are described herein that provide for interrupting multiple processors for processing packets of a single flow. The present system configures and controls operation of a network device, such as a network card, to process packet flows more efficiently than prior techniques. A single packet flow corresponds to a sequence of packets (over a communication path or channel) between a source device and a destination. In one embodiment, the source device may be a remote computer (identified by a source IP address and port) and the destination may be a destination service (identified by a destination IP address and port).

In one embodiment, the network device comprises multiple processors capable of processing packets of data exchanged over multiple packet flows (e.g., multiple source-to-destination connections). The present system improves upon existing technological processes by selecting and interrupting any one of the multiple processors to process packets of a single flow between the remote computer and the destination. Thus, the packets from the single flow are not restricted to being processed by only one assigned processor but rather can be switched to one or more different processors in parallel. Interrupting multiple processors for processing packets of a single flow means that one processor will be interrupted to process some packets of the single flow, while processors will be interrupted to process other packets of the single flow. In this way, different processors will be interrupted for processing different packets of the single flow.

As previously stated, existing technological processes assign one processor to one single packet flow and thus cannot interrupt multiple processors for a single packet flow. Thus, the present technique leverages multiple processors to process packets of the single flow and thus allows the present system to perform parallel processing of packets that belong to a single flow. This reduces any bottleneck otherwise resulting from merely a single processor being interrupted for processing packets of the single flow. Reducing this bottleneck decreases latency experienced by the source device. This also improves the operation of the source device, for example, where an executing application does not time-out, crash, or experience other issues due to delays in receiving data from the destination.

In one embodiment, the present system utilizes a thresholding mechanism that interrupts multiple processors to process packets of a single packet flow. In particular, the network device is configured to create interrupt requests for reach packet received over a network. The interrupt request is inserted into a queue associated with a processor. The interrupt request will interrupt the processor to process the associated packet. The network device is configured such that when a threshold number of interrupt requests associated a single flow of packets are inserted into a queue for processing, subsequent interrupt requests associated with subsequently received packets of the flow will be inserted into a different queue. Because each of the queues are associated with different processors (e.g., one-to-one relationship), switching to a different queue causes a different processor to be interrupted to process subsequently received packets of the flow of packets. Switching between queues over time will result in an interrupt distribution where interrupts created for a single packet flow is distributed across multiple processors. This results in significantly improved throughput of packet processing for the flow because a single processor is not overburdened with processing all packets of that flow.

Certain computing systems may be equipped with network cards capable of receiving millions of packets every second. These millions of packets must be distributed to an operating system using multiple processors. Every time a network card receives a packet, the network card interrupts a processor. In particular, a device driver of the processor gets interrupted and any code running on the processor must stop. The device driver executes on the processor to copy data of the packet into memory for further processing. This is very disruptive when a single processor is interrupted by hundreds of thousands or even millions of packets per second. This amount of interruption is a huge performance hit upon any code being executed by that processor. Accordingly, distributing packets of a single flow, such as a heavy flow of a large number of packets between a source and destination, to multiple processors greatly improves the operation of such processors and code being executed by the processors. This also improves the processing of packets of the flow because multiple processors can processing the packets, such as for parallel packet processing.

With reference to FIG. 1, one embodiment of a system 100 is illustrated that is configured to process network packets from a single flow with a mechanism that interrupts multiple processors to process the single flow. A more detailed description is provided with reference to FIG. 2. The system 100 includes a computer 125 comprising a module 105 and a network device 110. In one embodiment, the network device 110 comprises a network card. The computer 125 hosts services made accessible to remote computers over a network connected to the network device 110. Such services can correspond to application hosting services, software as a service (SaaS), network storage, email services, and a wide variety of other software applications and computer implemented services. Such instances of services are executed using computing resources of the computer.

The computer 125 comprises multiple processors, such as a processor 155, a processor 160, a processor 165, a processor 170, and/or other processors. Each processor is associated with a queue within which the network device 110 queues interrupt requests to interrupt a processor to process corresponding packets. That is, when a packet is received, an interrupt request is created and inserted into a queue. The interrupt request interrupts a processor associated with the queue to process the packet. In particular, a device driver of processor 155 is interrupted to process packets based upon interrupt requests of such packets being inserted into a queue 135. A device driver of processor 160 is interrupted to process packets based upon interrupt requests of such packets being inserted into a queue 140. A device driver of processor 165 is interrupted to process packets based upon interrupt requests of such packets being inserted into a queue 145. A device driver of processor 170 is interrupted to process packets based upon interrupt requests of such packets being inserted into a queue 150.

In one embodiment, the network device 110 receives flows 120 of packets from remote computers over a network. For example, a first remote computer may be accessing an application hosting service of the computer 125 as a first flow of packets. A second remote computer may be accessing a network storage service of the computer 125 as a second flow of packets. Other remote computers may be accessing services of the computer 125 as other flows of packets. A remote computer and a service of the computer 125 communicate by transmitting packets of data over a network. When the remote computer transmits packets to the computer 125, the packets are received by the network device 110 as a single flow between the remote computer and the service.

Each communication session between a remote computer and a service is facilitated by the exchange of packets of a single flow. Thus, multiple flows of packets can be received by the network device 110, where each flow corresponds to packets between a single remote computer and service. For example, the remote computer transmits packets according to a source IP address and port. The packets are destined to a service having a destination IP address and port. Thus, a particular flow of packets is identified based upon a pairing of source and destination IP addresses and ports. Any packet having that pairing of source and destination IP addresses and ports is considered to be part of the same single flow.

The module 105 is configured to maintain the plurality of queues to hold interrupt requests created in response to packets received by the network device 110 through the flows 120 of packets. The module 105 configures the network device 110, such as with a rule 115, for controlling how to queue interrupt requests for each single flow of packets between a pairing of source and destination IP addresses and ports. The rule 115 configures the network device 110 to switch between inserting interrupt requests into different queues for a single flow of packets. The switching between different queues of different processors is triggered based upon a threshold number of interrupt requests, created in response to receiving packets of the single flow, being insert into the queue. The rule and threshold is applied on a flow by flow basis. That is, the queueing of interrupt requests of a first flow between a source and destination pairing does not affect the queueing of interrupt requests of a second flow between a different source and destination pairing.

The network device 110 is controlled to interrupt multiple processors for processing different packets of a single flow of packets by queueing interrupt requests for the single flow of packets into different queues based upon the rule 115. The module 105 tracks interrupt request counts 130 per flow of packets and per queue. For example, a count of interrupt requests for a particular flow of packets inserted into a particular queue is tracked. When the count of interrupt requests reaches the threshold defined by the rule 115, the network device 110 is controlled to queue subsequent interrupt requests into a different queue. This causes subsequent packets of that flow to be processed by a different processor associated with the different queue. In this way, interrupt requests for a single flow are inserted into different queues over time to distribute the processing of packets of the single flow across multiple processors.

In one embodiment of determining which queue(s) should be selected for queueing interrupts of the single flow, packet counters are maintained for each queue. The packet counters are configurable by a host operating system. Packets of the single flow may be hashed based upon a source IP and port in order to determine which queue(s) should be used for queuing interrupt requests. This is performed until a limit of a packet counter of a queue is reached. When the limit is reached, a selection algorithm is executed to select a different queue to use for queuing interrupt requests in place of the queue. In one embodiment, a lowest counter first selection algorithm is performed. In particular, packet rates per queue are maintained. When the queue exceeds a packet rate, a next queue is picked based upon the next queue's packet rate (e.g., a queue with a lowest packet rate is selected as the next queue). In another embodiment, a flow count selection algorithm is performed. In particular, a flow counter per queue is maintained. When the queue exceeds the packet rate, the next queue is picked based upon a flow counter of the next queue having a least flow count (e.g., the least number of different flows are being queued in the next queue).

In another embodiment, a queue affinity map is used along with the lowest counter first selection algorithm or the flow count selection algorithm. In particular, the host operation system is configured to set the queue affinity map based upon a host computer's numa affinity to avoid latencies. For example, the host computer has 2 processors each with 16 cores. The operating system is configured to set a queue affinity map as 16+16. This means that the first 16 queues should attempt to pick next/parallel queue in the same 16 core set. This helps the operating system avoid cross numa latencies. A packet counter per queue is maintained. However, a weight is given to the queues that belong to the queue set (e.g., the first 16 queues) that the operating system provided. Thus, queues within the queue set will be picked first, if possible, based upon their weight. In the event a queue in the queue set cannot be picked, then a different queue will be selected from a different queue set.

This will reduce the burden of a single processor having to process all packets of a single flow because multiple processors will now be interrupted for processing packets of the single flow. This greatly improves the operation of the processor because the processor is able to efficiently make progress in executing other code because the processor is not being interrupted so often to process packets. This is especially true when the single flow corresponds to a heavy flow of many packets. Distributing the processing of packets for the single flow across multiple processors also reduces the likelihood of a single processor becoming a bottleneck for processing packets of that single flow. Instead, multiple processors can process packets of the same flow, such as in parallel.

In one embodiment, interrupt requests 175 of the single flow are distributed to multiple queues. This allows the interrupt requests 175 of the single flow to be distributed into multiple queues, such as simultaneously. Thus, an operating system will be able to process more packets per second per flow, such as parallel processing of packets of the single flow, than what could be processed by a single processor/queue. That is, the operating system can receive packets of the single flow at multiple processors, such as simultaneously.

Figure 2:
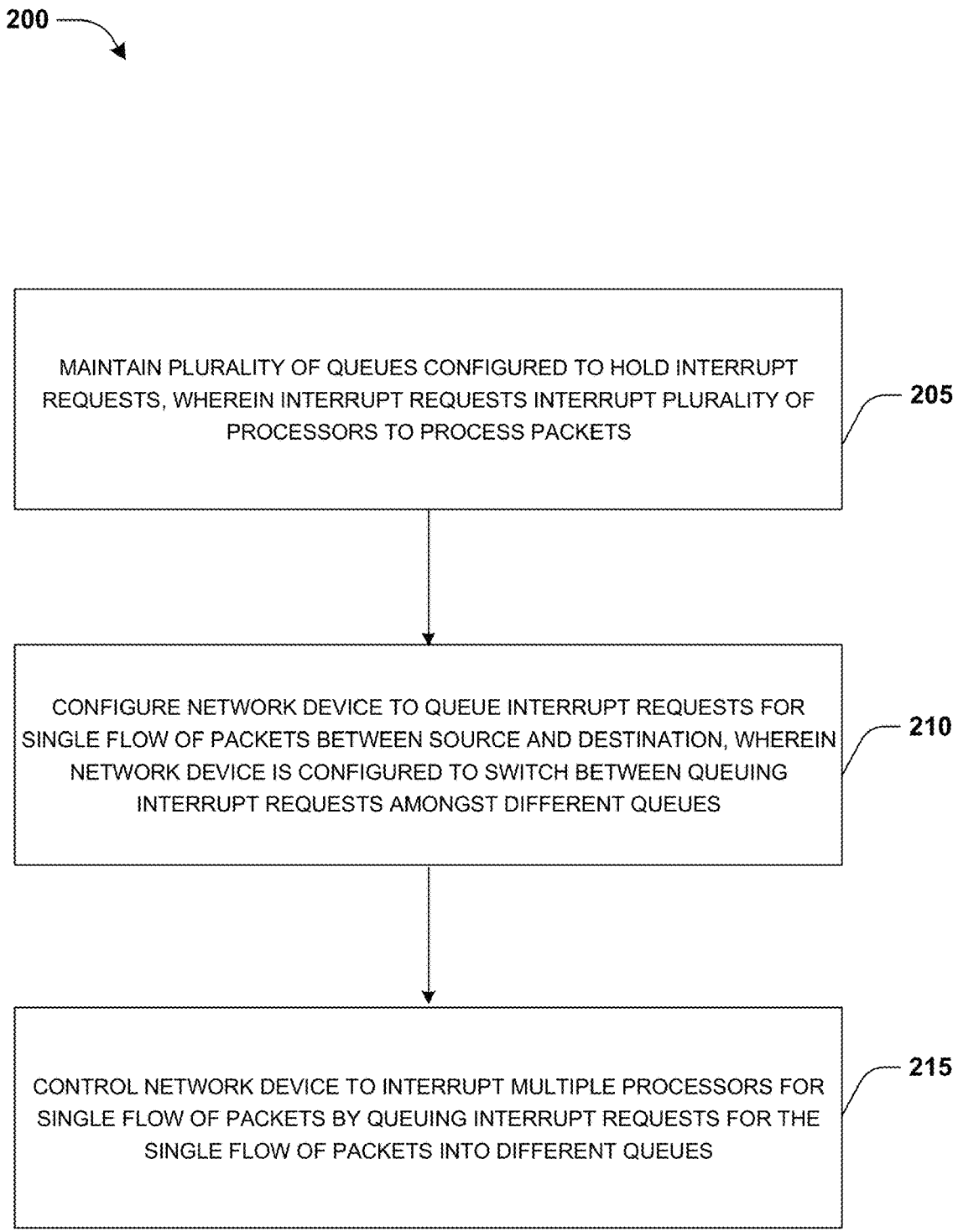
FIG. 2 illustrates an embodiment of a method associated with interrupting multiple processors for processing packets of a single flow.

With reference to FIG. 2, one embodiment of a computer implemented method 200 that interrupts multiple processors to process different packets of a single flow is illustrated. In one embodiment, the method 200 is performed by the module 105 and system 300 of FIGS. 3A-3D utilizing various computing resources of a computer that is configured as a special purpose machine to implement the disclosed features in one or more combinations, and/or other computers similarly configured. The computing resources, such as a processor, are used for executing instructions associated with controlling a network device to interrupt multiple processors for processing packets of a single flow. Memory and/or disks are used for storing packets, interrupt requests, a rule 310 for controlling a network device 305, etc. The network device 305 is used for receiving packets over a network from a source attempting to access a destination, such as a client computer attempting to access a service hosted by a computer comprising the network device 305. The method 200 is triggered upon initialization of the network device 305.

The network device 305, such as a network interface card, is configured to connect the computer over the network with remote computers. The computer may host various services that are accessible to the remote computers. The services are executed by a plurality of processors of the computer. In one embodiment, the computer comprises a processor 350, a processor 355, a processor 360, a processor 370, and/or other processors.

Each processors is capable of executing code to process data communicated between the remote computers and the computer. In particular, the network device 305 receives packets of data from the remote computers. Each packet specifies a source of the packet, such as a source IP and port used by a remote computer. Each packet specifies a destination of the packet, such as a destination IP and port used by a service of the computer being access by the remote computer. Packets between a particular source and destination are considered a single flow of packets between that source and that destination. Packets of other source and destination pairs are considered different flows of packets between those source and destination pairs.

The network device 305 is configured to notify processors of incoming packets for processing by interrupting such processors using interrupt requests. In particular, each processor is associated with a corresponding queue. In one embodiment, the processor 350 is associated with a queue 330. The processor 355 is associated with a queue 335. The processor 360 is associated with a queue 340. The processor 370 is associated with a queue 345. Each processor is configured with a device driver. When an interrupt request of an incoming packet is inserted within a queue associated a processor, the device driver of that processor is interrupted. The processor stops executing what code was currently being executed, and executes the device driver to load the packet into memory for further processing. In this way, a plurality of queues are maintained, at 205, to hold interrupt requests of packets received by the network device 305.

The flow can correspond to various types of flows of data. In one embodiment, the flow corresponds to a generic routing encapsulation (GRE) flow. The GRE flow corresponds to a tunneling protocol that can encapsulate various network layer protocols inside virtual point-to-point links over an internet protocol (IP) network. Packets of the GRE flow can be used to transmit data between the source such as the remote device and the destination such as the service. In another embodiment, the flow corresponds to a user datagram protocol (UDP) flow. The UDP flow corresponds to packets of messages transmitted as datagrams between a source and a destination on the internet protocol (IP) network. The UDP flow uses a connectionless communication model between the source and destination. In another embodiment, the flow corresponds to a transmission control protocol (TCP) flow. The TCP flow corresponds to host-to-host connectivity at a transport layer, such as between a source and destination on the internet protocol (IP) network. In this way, the network device 305 can receive various types of packets over a network.

Existing techniques for queueing interrupt requests of packets by the network device 305 would queue all packets of a single flow into the same queue of the same processor for locality purposes. For a heavy flow of a substantial number of packets between a source and destination pair, this can overload the processor and create a bottleneck. The processor is overloaded and becomes a bottleneck because the processor is being interrupted by interrupt requests for the packet. Thus the processor is unable to make adequate progress in executing other applications and code. Also, other processors are unable to process packets of the flow.

Accordingly, the network device 305 is configured by the module 105, at 210, with a rule 310 for controlling how to queue interrupt requests for a flow of packets between a source and a destination. The rule 310 specifies that when a threshold number of interrupt requests of a single flow are inserted into the same queue, the network device 305 is to switch to inserting interrupt requests, created in response to subsequently received packets of that single flow, into a different queue. The rule 310 will cause the network device 305 to keep switching between different queues each time a threshold number of interrupt requests are inserted into a particular queue. This switching between queues will cause packets of that single flow to be distributed to multiple processors for processing.

At 215, the network device 305 is controlled using the rule 310 to interrupt multiple processors for each flow of packets by queueing interrupt requests into different queues. In one embodiment of controlling the network device 305, the network device 305 receives a first flow 315 of packets, a second flow 320 of packets, and/or other flows of packets between source and destination pairs. The first flow 315 of packets may correspond to packets communicated between a first remote device and a first service hosted by the computer comprising the network device 305. The second flow 320 corresponds to packets communicated between a second remote device and a second service (or the first service) hosted by the computer.

The network device 305 can distinguish between packets of the first flow 315 and packets of the second flow 320. For example, the network device 305 receives a packet. The network device 305 parses the packet, such as a header, to identify a source of the packet. The source can correspond to a source IP and port used by the first remote device. The network device 305 parses the packet to identify a destination of the packet, such as a destination IP and port used by the first service. Based upon the source IP and port and the destination IP and port, the network device 305 can determine that the packet is part of the first flow 315 of packets and not the second flow 320.

In one embodiment of identifying a flow of a packet, the packet comprises a tunnel packet having an overlay packet and an underlay packet. The network device 305 parses the underlay packet to determine that the tunnel packet corresponds to the first flow 315 between the first remote device and the first service. The network device 305 bypasses parsing the overlay packet for identifying the flow to which the tunnel packet belongs.

In order to determine whether a threshold number of interrupt requests for a single flow has been reached, the module 105 maintains interrupt request counts 325 per flow and queue. When an interrupt request of a flow is inserted into a particular queue, a corresponding interrupt request count is incremented. In this way, the module 105 can compare the interrupt request count with the threshold defined by the rule 310. The comparison is performed in order to determine whether a next interrupt request should be inserted in the same queue or a different queue. If the interrupt request count is below the threshold, then more interrupt requests can be inserted within the queue. If the interrupt request count has reached the threshold, then the network device 305 is controlled to stop queuing interrupt requests into the queue and to queue interrupt requests into a different queue for the same flow of packets. This causes a different processor to now process packets of the flow. Upon queuing the interrupt request in the different queue, the interrupt request count is reset and incremented to indicate that an interrupt request has been inserted into the different queue.

In one embodiment of queueing interrupt requests, the module 105 selects the queue 330 for queuing 375 interrupt requests of the first flow 315. This will cause interrupt requests of packets received as part of the first flow 315 to be inserted into the queue 330 for processing by the processor 350. When a packet of the first flow 315 is received, the module 105 determines whether an interrupt request count for the first flow 315 and the queue 330 has reached the threshold defined by the rule 310. If the interrupt request count has not reached the threshold, an interrupted request is created and inserted 375 within the queue 330 for processing of the packet by the processor 350. In one embodiment, multiple queues are selected for queuing 375 interrupts requests of the first flow 315 315. This allows interrupt requests of the first flow 315 to be distributed into multiple queues, such as simultaneously. Thus, an operating system will be able to process more packets per second per flow, such as the first flow 315, than what could be processed by a single processor/queue.

Similarly, the module 105 selects the queue 340 for queuing 380 interrupt requests for the second flow 320. This will cause interrupt requests of packets received as part of the second flow 320 to be inserted into the queue 340 for processing by the processor 360. When a packet of the second flow 320 is received, the module 105 determines whether an interrupt request count for the second flow 320 and the queue 360 has reached the threshold defined by the rule 310. If the interrupt request count has not reached the threshold, an interrupted request is created and inserted 380 within the queue 340 for processing of the packet by the processor 360. In one embodiment, multiple queues are selected for queuing 380 interrupts requests of the second flow 320. This allows interrupt requests of the second flow 320 to be distributed into multiple queues, such as simultaneously. Thus, the operating system will be able to process more packets per second per flow, such as the second flow 320, than what could be processed by a single processor/queue.

Figure 3A:
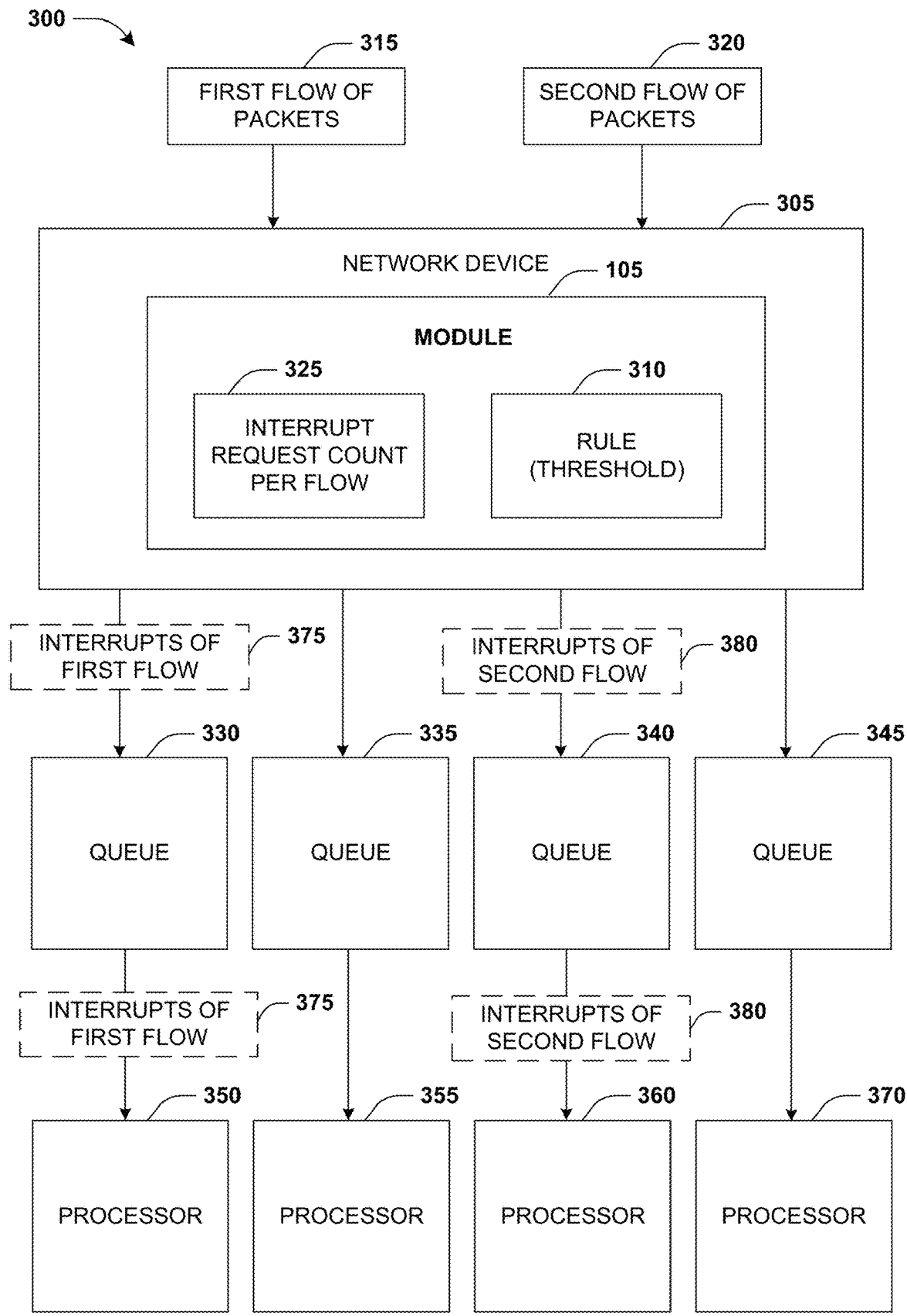
FIG. 3A illustrates an embodiment of a system associated with interrupting multiple processors for processing packets of a single flow, where interrupt requests of a first flow and a second flow are inserted within queues.
Figure 3B:
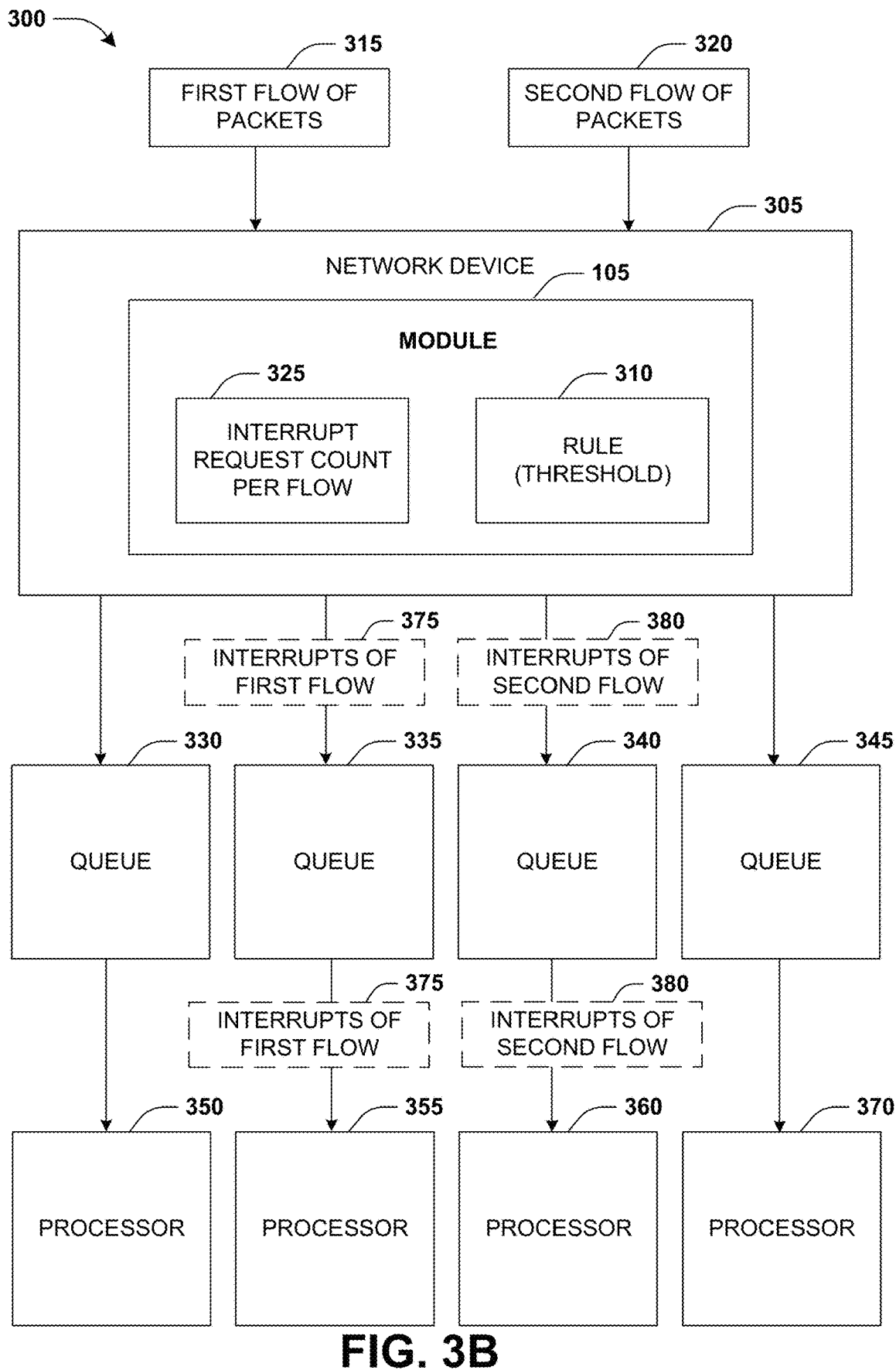
FIG. 3B illustrates an embodiment of a system associated with interrupting multiple processors for processing packets of a single flow, where interrupt requests of a first flow are switched from being inserted into a queue to a different queue.

In one embodiment, the module 105 determines that the interrupt request count for the first flow 315 has reached the threshold defined by the rule 310. Accordingly, subsequent interrupt requests for packets of the first flow 315 are switched from being inserted 375 into the queue 330 to being inserted 375 into the queue 335, as illustrated by FIG. 3B. In this way, instead of the processor 350 processing the packets, the processor 355 will now process the packets of the first flow 315. In one embodiment, multiple different queues are selected for queuing 375 interrupts requests of the first flow 315. The module 105 may continue to control the network device 305 to queue 380 packets of the second flow 320 into the queue 340. This is based upon the module 105 determining that the interrupt request count for the second flow 320 has not reached the threshold.

Because different processors are processing packets of the first flow 315, a driver of the destination of the first flow 315 is configured to evaluate the plurality of queues for interrupt requests targeting the destination. That is, the first service is configured to process packets of the first flow 315 from interrupt requests inserted in different queues. Because the interrupt requests and/or packets may be received out of order due to being in different queues of different processors, the driver is configured to reorder packets associated with interrupt requests of the first flow 315 from different queues.

Figure 3C:
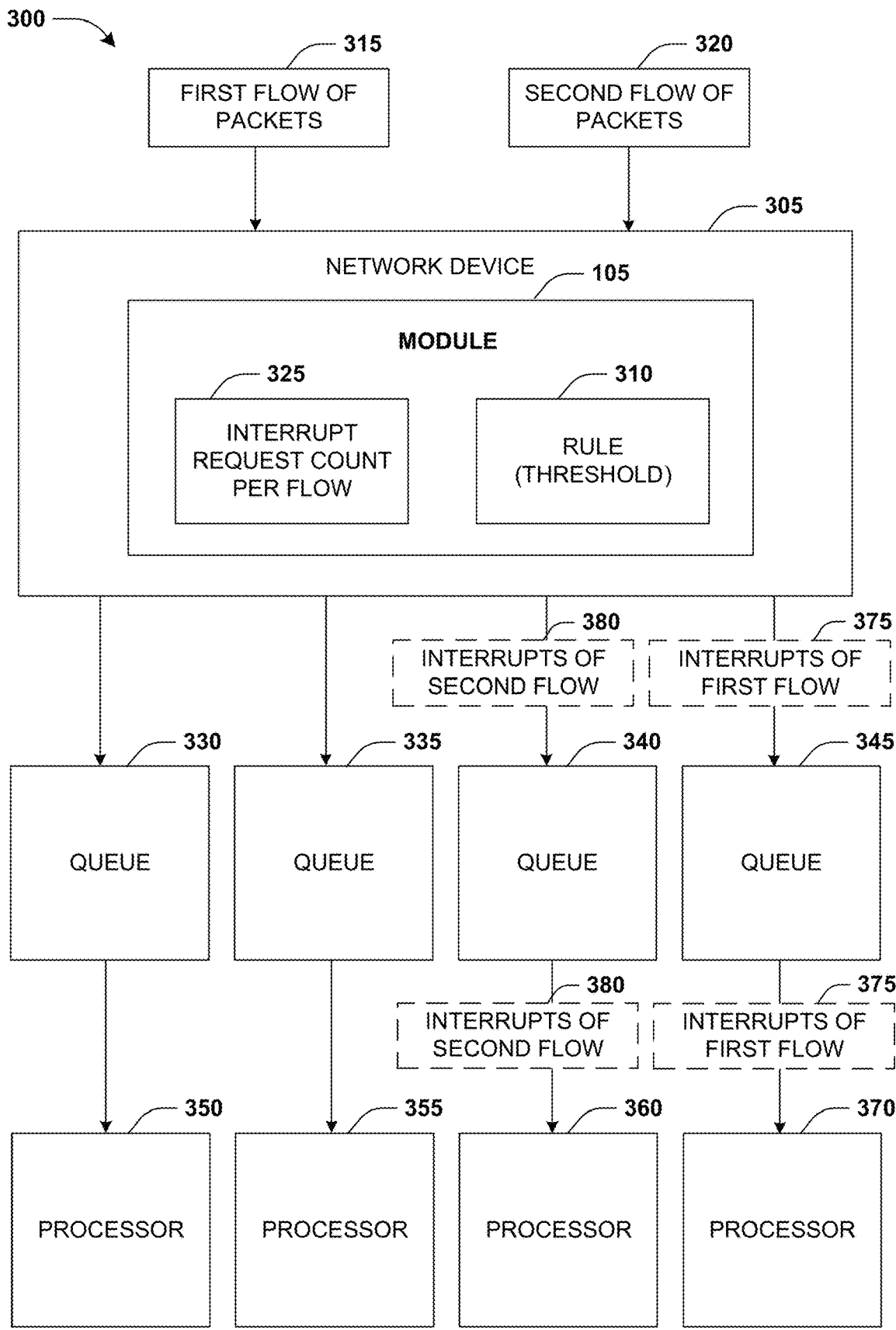
FIG. 3C illustrates an embodiment of a system associated with interrupting multiple processors for processing packets of a single flow, where interrupt requests of a first flow are switched from being inserted into a queue to a different queue.

In one embodiment, the module 105 determines that the interrupt request count for the first flow 315 has again reached the threshold defined by the rule 310. Accordingly, subsequent interrupt requests of packets of the first flow 315 are switched from being inserted 375 into the queue 335 to being inserted 375 into the queue 345, as illustrated by FIG. 3C. In this way, instead of the processor 355 processing the packets, the processor 370 will now process the packets of the first flow 315. In one embodiment, multiple different queues are selected for queuing 375 interrupts requests of the first flow 315. The module 105 may continue to control the network device 305 to queue 380 packets of the second flow 320 into the queue 340. This is based upon the module 105 determining that the interrupt request count for the second flow 320 has not reached the threshold.

Figure 3D:
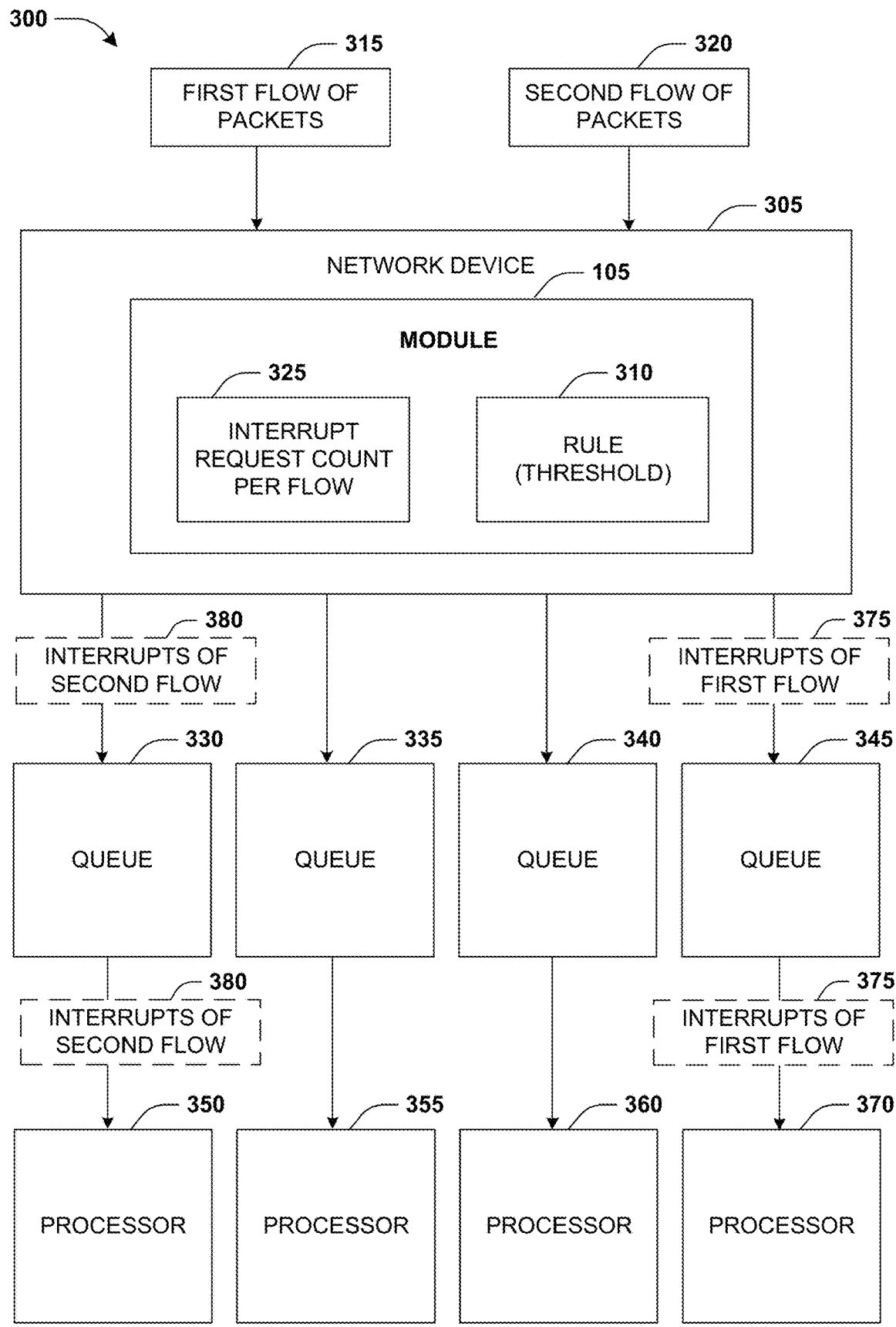
FIG. 3D illustrates an embodiment of a system associated with interrupting multiple processors for processing packets of a single flow, where interrupt requests of a second flow are switched from being inserted into a queue to a different queue.

In one embodiment, the module 105 determines that the interrupt request count for the second flow 320 has reached the threshold defined by the rule 310. Accordingly, subsequent interrupt requests of packets of the second flow 320 are switched from being inserted 380 into the queue 340 to being inserted 380 into the queue 330, as illustrated by FIG. 3D. In this way, instead of the processor 360 processing the packets, the processor 350 will now process the packets of the second flow 320. In one embodiment, multiple different queues are selected for queuing 380 interrupts requests of the second flow 320. The module 105 may continue to control the network device 305 to queue 375 packets of the first flow 315 into the queue 345. This is based upon the module 105 determining that the interrupt request count for the first flow 315 has not reached the threshold.

In this way, interrupt requests for a single flow are inserted into different queues over time to distribute the processing of packets of the single flow across multiple processors. This will reduce the burden of a single processor having to process all packets of a single flow because multiple processors will now be interrupted for processing packets of the single flow. This greatly improves the operation of the processor because the processor is able to efficiently make progress in executing other code because the processor is not being interrupted so often by packets of the same flow. This is especially true when the single flow corresponds to a heavy flow of many packets. Distributing the processing of packets for the single flow across multiple processors also reduces the likelihood of a single processor becoming a bottleneck for processing the single flow. Instead, multiple processors can process packets of the same flow.

Figure 4:
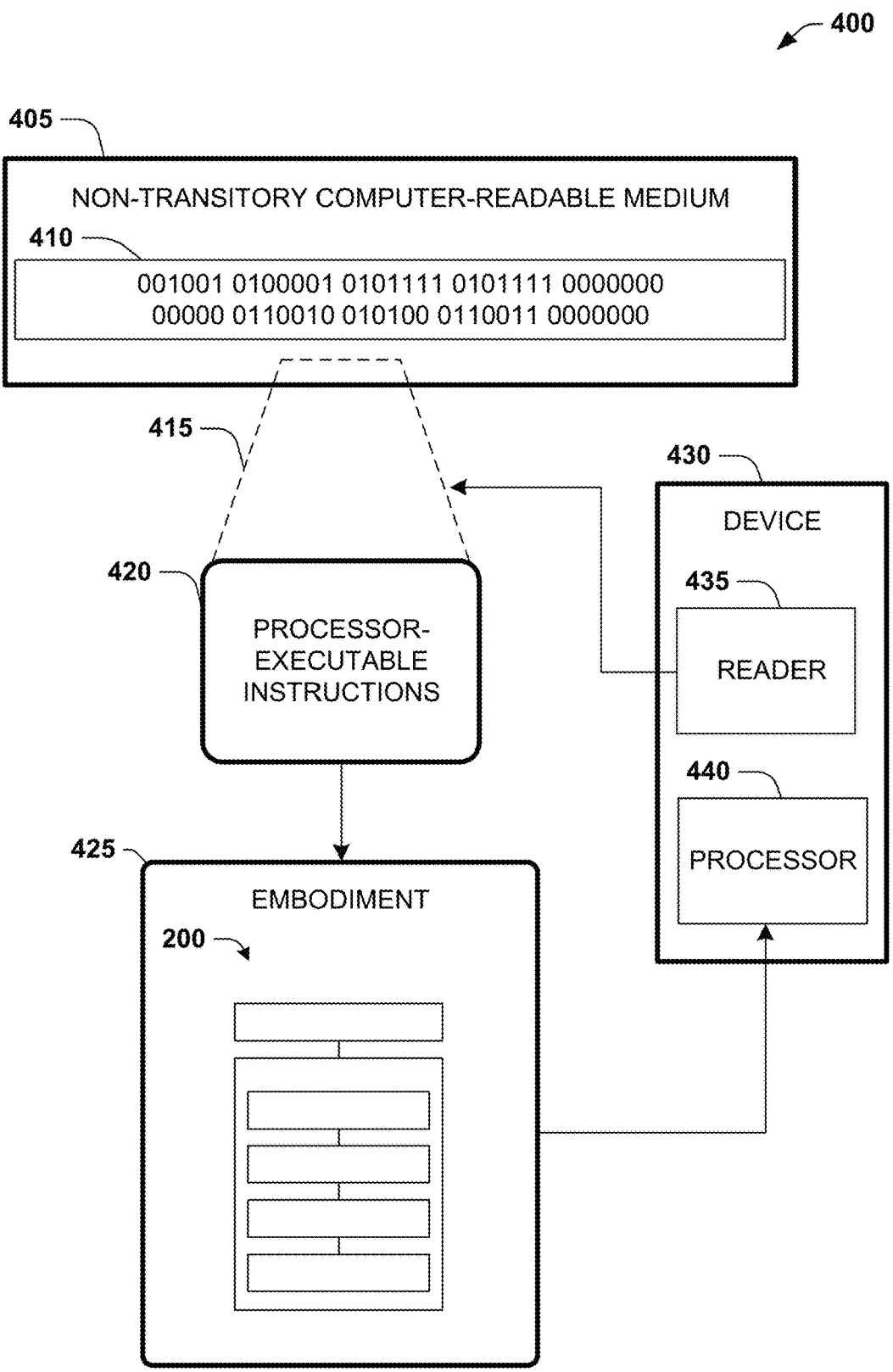
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
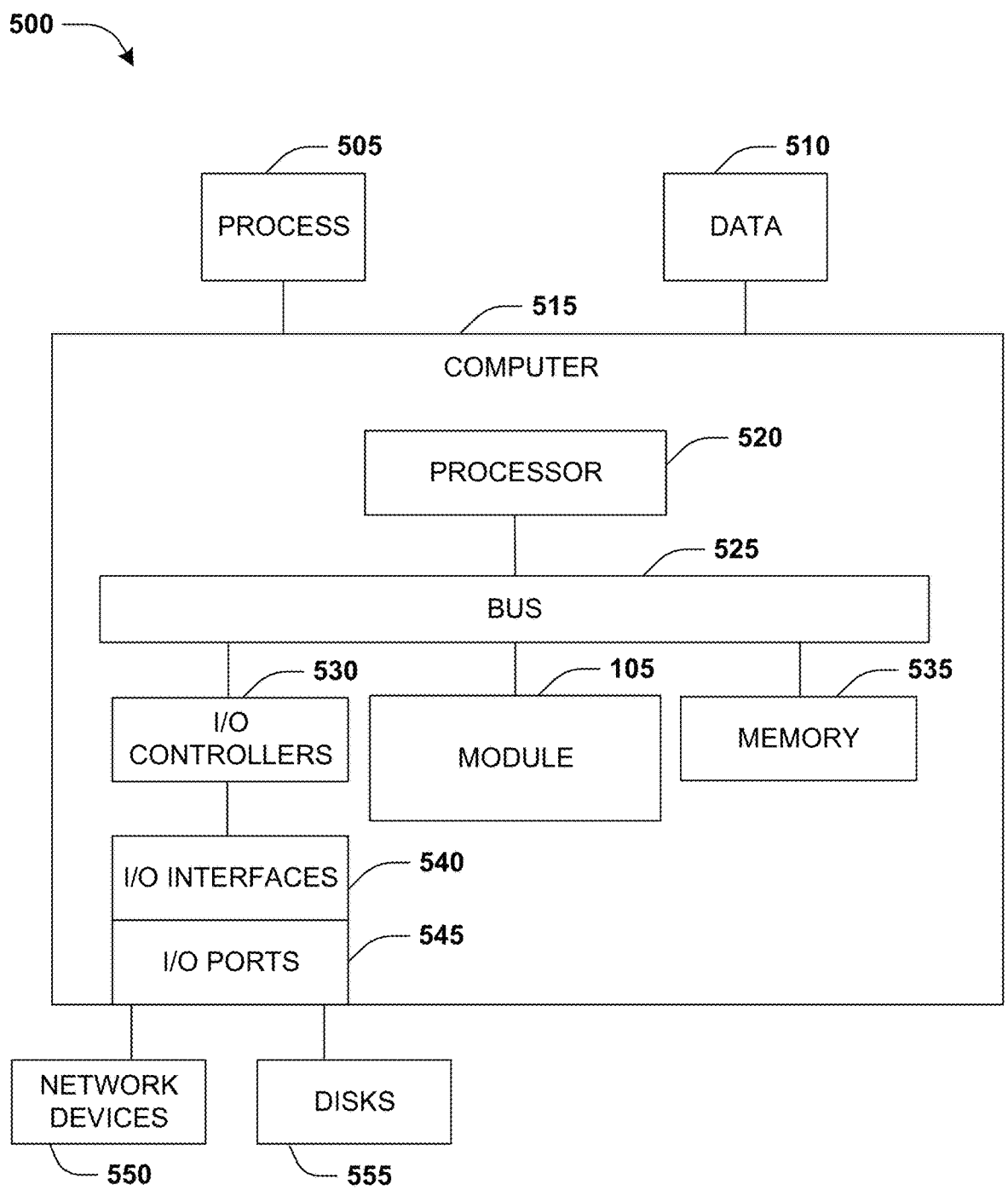
FIG. 5 illustrates an embodiment of a computing system configured with the example systems and/or methods disclosed.

FIG. 5 illustrates one embodiment of a computing system 500 that is configured and/or programmed with one or more of the example systems and methods described herein, and/or equivalents. The computing system 500 may include at least the computer 515 that includes a processor 520, a memory 535, and I/O ports 545 operably connected by a bus 525. In one embodiment, the computer 515 may include logic of the module 105 configured to facilitate the system 100 and/or the method 200 shown in FIGS. 1-2. In different embodiments, the logic of the module 105 may be implemented in hardware, a non-transitory computer-readable medium 505 with stored instructions, firmware, and/or combinations thereof. While the logic of the module 105 is illustrated as a hardware component attached to the bus 525, it is to be appreciated that in other embodiments, the logic of the module 105 could be implemented in the processor 520, stored in memory 535, or stored in disk 555.

In one embodiment, logic of the module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
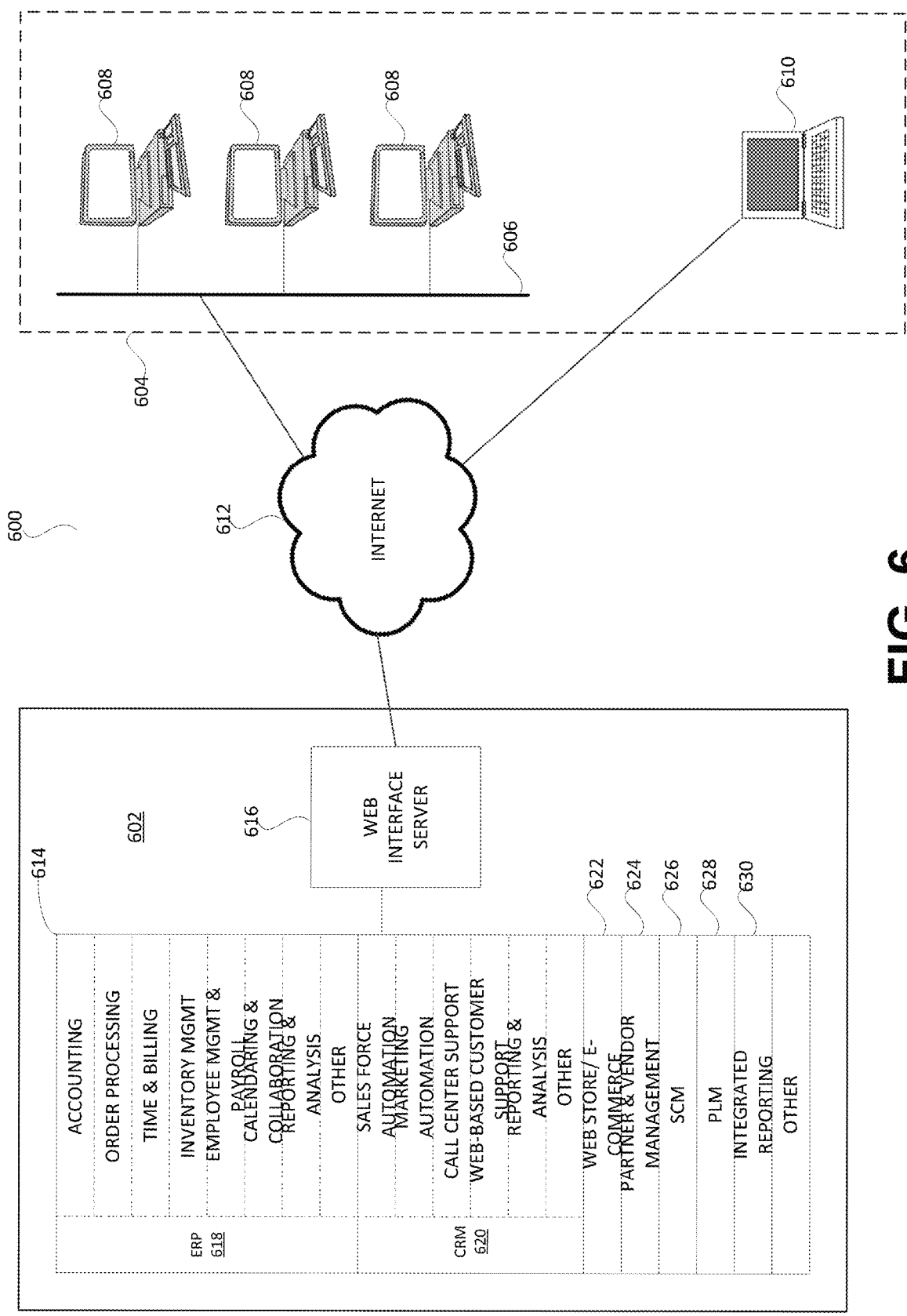
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
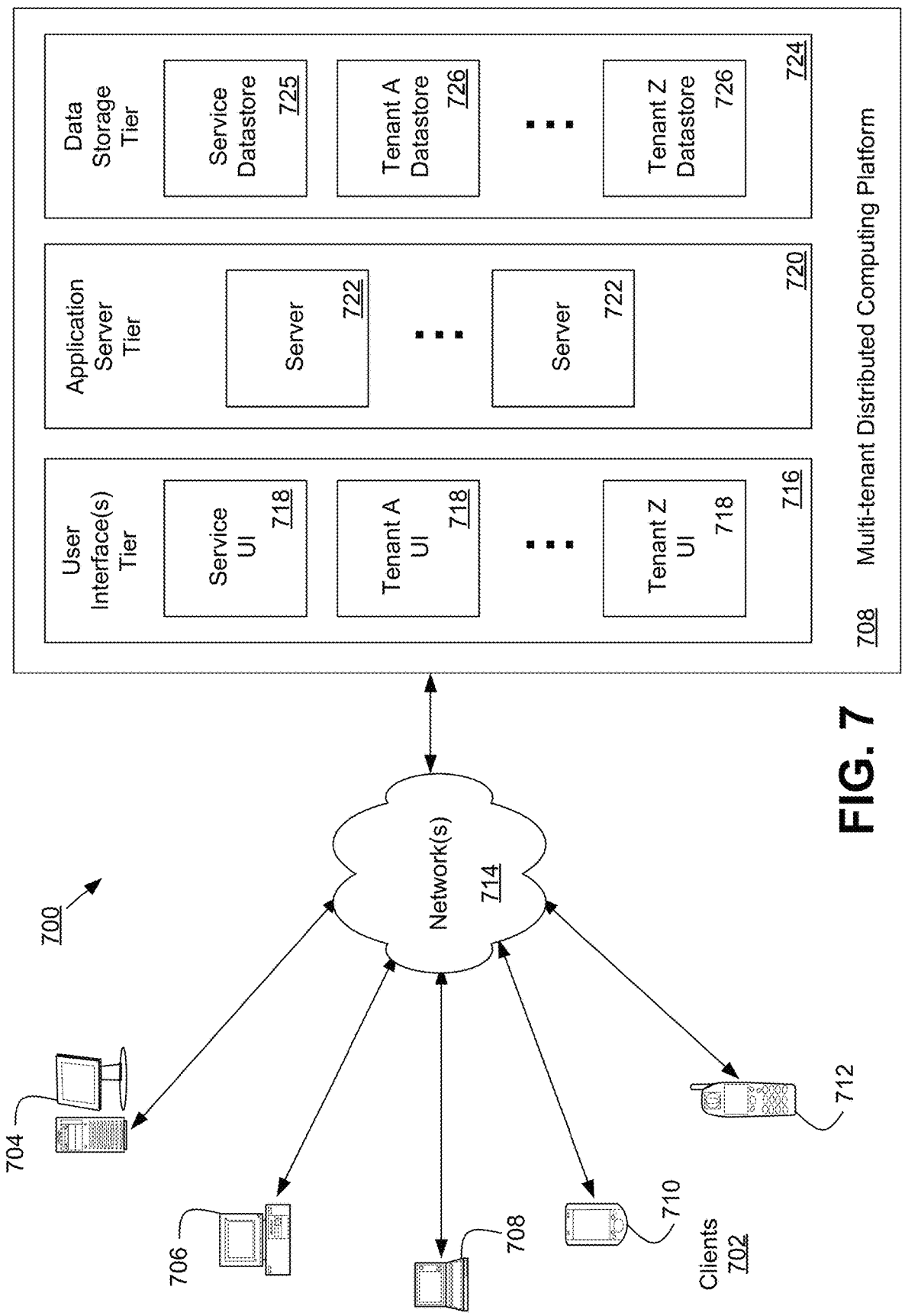
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of suitable computing devices include specially programmed or configured personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers that are specially programmed with instructions for implemented one or more embodiments as disclosed herein. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:

maintain a plurality of queues configured to hold interrupt requests created in response to packets received by a network device, wherein the interrupt requests interrupt a plurality of processors to process the packets, and wherein each queue is associated with a corresponding processor;

configure the network device to queue interrupt requests for a single flow of packets between a source and a destination, wherein the network device is configured to switch from inserting interrupt requests into a first queue to inserting into a second queue upon queuing a threshold number of interrupt requests for the single flow of packets into the first queue;

in response to receiving a packet from a remote computer, evaluate the packet to determine that the packet is part of the single flow between the source as the remote computer and a destination as a service being accessed by the remote computer;

determine a count of interrupt requests inserted into the first queue for the single flow;

responsive to the current count of interrupt requests being less than the threshold number of interrupt requests:
(i) construct an interrupt request for the packet; and
(ii) queue the interrupt request into the first queue; and control the network device to interrupt multiple processors for the single flow of packets by inserting the interrupt requests for the single flow of packets into different queues of the plurality of queues.

2. The non-transitory computer-readable medium of claim 1, wherein the instructions comprise instructions to:
responsive to queuing the interrupt request into the first queue, increment the count of interrupt requests inserted into the first queue for the single flow.

3. The non-transitory computer-readable medium of claim 1, wherein the instructions comprise instructions to:
determine a count of interrupt requests inserted into the first queue for the single flow;
responsive to the count of interrupt requests triggering the threshold number of interrupt requests,
select a different queue from the plurality of queues for queueing interrupt requests for the single flow;
construct an interrupt request for the packet; and
queue the interrupt request into the different queue from the plurality of queues.

4. The non-transitory computer-readable medium of claim 3, wherein the instructions comprise instructions to:
responsive to queuing the interrupt request into the different queue:
reset the count of interrupt requests to indicate that the interrupt request was inserted into the different queue; and
increment the count of interrupt requests in response to subsequent interrupt requests for the single flow being inserted into the different queue.

5. The non-transitory computer-readable medium of claim 1, wherein the network device is a network card of a computing device, and wherein the instructions comprise instructions to:
control the network card to queue interrupt requests into the queues.

6. The non-transitory computer-readable medium of claim 1, wherein the single flow is a transmission control protocol (TCP) flow of a TCP connection between a remote client device and a service hosted by the computing device, and wherein the instructions comprise instructions to:
construct an interrupt request from a TCP packet of the TCP flow; and
queue the interrupt request.

7. A computing system, comprising:
a processor connected to memory; and
a module stored on a non-transitory computer readable medium and configured with instructions that when executed by the processor cause the processor to:
maintain a plurality of queues configured to hold interrupt requests created in response to packets received by a network device, wherein the interrupt requests interrupt a plurality of processors to process the packets, and wherein each queue is associated with a corresponding processor;
configure the network device to queue interrupt requests for a single flow of packets between a source and a destination, wherein the network device is configured to switch from inserting interrupt requests into a first queue to inserting into a second queue upon queuing a threshold number of interrupt requests for the single flow of packets into the first queue;
in response to receiving a tunnel packet comprising an overlay packet and an underlay packet:
(i) parse the underlay packet to determine that the tunnel packet corresponds to the single flow between the source and the destination; and
(ii) queue the tunnel packet; and
control the network device to interrupt multiple processors for the single flow of packets by inserting interrupt requests for the single flow of packets into different queues of the plurality of queues.

8. The computing system of claim 7, wherein the instructions comprise instructions that cause the processor to:
bypass parsing the overlay packet for determining whether the tunnel packet corresponds to the single flow or a different flow.

9. The computing system of claim 7, wherein the instructions to parse comprise instructions that cause the processor to:
parse a header of the underlay packet to identify a source and destination of the tunnel packet based upon a source internet protocol (IP) address and port and a destination IP and port specified within the header.

10. The computing system of claim 7, wherein interrupt requests for the single flow of packets are queued into multiple queues of the plurality of queues for parallel processing the single flow of packets by multiple processors of the plurality of processors.

11. The computing system of claim 7, wherein the single flow is a user datagram protocol (UDP) flow, and wherein the instructions comprise instructions to:
construct an interrupt request from a UDP packet of the UDP flow; and
queue the interrupt request.

12. A computer-implemented method, the computer-implemented method involving a computing device comprising a processor, and the computer-implemented method comprising:
maintaining, by the processor, a plurality of queues configured to hold interrupt requests created in response to packets received by a network device, wherein the interrupt requests interrupt a plurality of processors to process the packets, and wherein each queue is associated with a corresponding processor;
configuring, by the processor, the network device to queue interrupt requests for a single flow of packets between a source and a destination, wherein the network device is configured to switch from inserting interrupt requests into a first queue to inserting into a second queue upon queuing a threshold number of interrupt requests for the single flow of packets into the first queue;

in response to receiving a packet from a remote computer, evaluating the packet to determine that the packet is part of the single flow of packets between the source as the remote computer and a destination as a service being accessed by the remote computer;

determining a count of interrupt requests inserted into the first queue for the single flow of packets;

responsive to the count of interrupt requests triggering the threshold number of interrupt requests:
(i) selecting a different queue from the plurality of queues for queueing the interrupt requests for the single flow of packets;
(ii) constructing an interrupt request for the packet received; and
(iii) queuing the interrupt request into the different queue of the plurality of queues; and controlling, by the processor, the network device to interrupt multiple processors for the single flow of packets by inserting the interrupt requests for the single flow of packets into different queues of the plurality of queues.

13. The computer-implemented method of claim 12, further comprising:

configuring a driver of the destination of the single flow to evaluate the plurality of queues for interrupt requests targeting the destination.

14. The computer-implemented method of claim 13, further comprising:

configuring the driver to reorder packets, associated with interrupt requests of the single flow within different queues, for processing by the destination.

15. The computer-implemented method of claim 12, further comprising:

providing each device driver of each processor with access to interrupt requests within corresponding queues associated with each processor.

16. The computer-implemented method of claim 12, further comprising:

receiving a packet from a remote computer;

evaluating the packet to determine that the packet is part of the single flow between the source as the remote computer and a destination as a service being accessed by the remote computer;

determining a count of interrupt requests inserted into the first queue for the single flow;

responsive to the current count of interrupt requests being less than the threshold number of interrupt requests, constructing an interrupt request for the packet; and queueing the interrupt request into the first queue.

* * * * *